United States Patent [19]

Saderholm et al.

[11] Patent Number: 5,560,649
[45] Date of Patent: Oct. 1, 1996

[54] AIR BAG CUSHION HAVING VARIABLE VOLUME

[75] Inventors: Davin G. Saderholm, Salt Lake City; Brian M. Shaklik, Bountiful, both of Utah

[73] Assignee: Morton International, Inc., Chicago, Ill.

[21] Appl. No.: 429,267

[22] Filed: Apr. 25, 1995

[51] Int. Cl.⁶ .................................................. B60R 21/16
[52] U.S. Cl. ........................................ 280/743.1; 280/739
[58] Field of Search .......................... 280/743.1, 743.2, 280/731, 728.1, 739

[56] References Cited

U.S. PATENT DOCUMENTS

| | | | |
|---|---|---|---|
| 3,473,824 | 10/1969 | Carey et al. | 280/150 |
| 3,476,402 | 11/1969 | Wilfert | 280/729 |
| 3,966,224 | 6/1976 | Campbell et al. | 280/735 |
| 4,021,057 | 5/1977 | Held et al. | 280/735 |
| 4,213,634 | 7/1980 | Hoshino et al. | 280/728.1 |
| 5,048,863 | 9/1991 | Henseler et al. | 280/743 |
| 5,240,283 | 8/1993 | Kishi et al. | 280/729 |
| 5,249,825 | 10/1993 | Gordon et al. | 280/743 |
| 5,282,646 | 2/1994 | Melvin et al. | 280/729 |
| 5,358,273 | 10/1994 | Onishi et al. | 280/743.1 |
| 5,501,488 | 3/1996 | Saderholm et al. | 280/739 |

FOREIGN PATENT DOCUMENTS

| | | | |
|---|---|---|---|
| 4142326 | 6/1993 | Germany | 280/743.1 |
| 3-136945 | 6/1991 | Japan | 280/743.1 |
| 4-166454 | 6/1992 | Japan | 280/743.1 |

Primary Examiner—Paul N. Dickson
Attorney, Agent, or Firm—Taylor J. Ross; Gerald K. White

[57] ABSTRACT

An air bag cushion having variable volume. The air bag includes a front wall having a central region for contacting the passenger, and a periphery. This periphery is connected to a periphery of both an intermediate rear wall and an outer rear wall. Both of these rear walls are operatively connected to the gas generator, but the outer rear wall has a larger area than the intermediate rear wall. The generator provides gas to initially inflate the volume defined between the front wall and intermediate wall. The intermediate wall, however, is connected to the gas generator in a manner which permits its release upon exceeding a predetermined pressure within the bag. Above this pressure the intermediate wall is released and the gas inflates the larger volume defined between the front wall and the outer rear wall. As such, if a small amount of gas is produced, such as for a minor collision or due to reduced ambient temperature, the smaller volume is inflated to the proper pressure. If a greater amount of gas is generated, such as for a major collision or due to increased ambient temperature, the larger volume is inflated to provide the proper pressure.

20 Claims, 1 Drawing Sheet

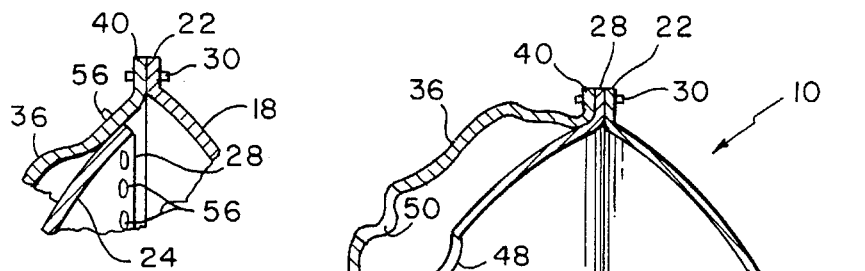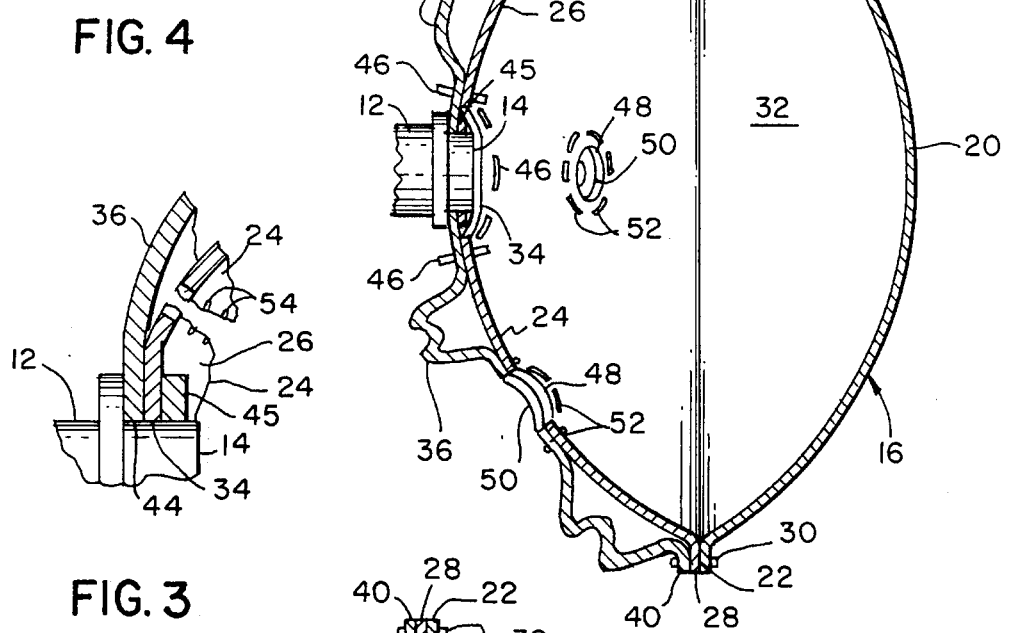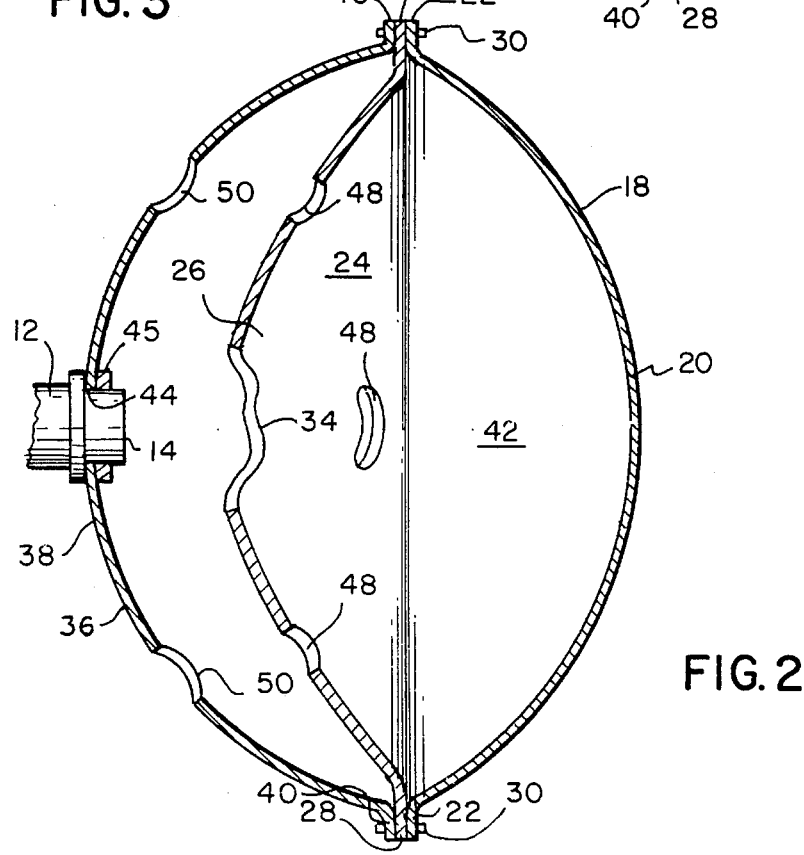

AIR BAG CUSHION HAVING VARIABLE VOLUME

BACKGROUND OF THE INVENTION

1. Field of the Invention

The present invention relates in general to inflatable passive restraint systems for use in vehicles for restraining the movement of a seated occupant during a collision. In particular, the present invention relates to an improved inflatable air bag having a variable volume for proper inflation over a wide range of generated gas volumes.

2. Description of the Related Art

In recent years, passive restraint systems, particularly those restraint systems incorporating inflatable bags or cushions (commonly referred to as "air bags") have been used with increasing frequency in automobiles. In such air bag systems, one or more air bag modules are stowed in respective storage areas within the passenger compartment of the vehicle. Upon actuation, the air bags are deployed into the vehicle passenger compartment through openings in the vehicle interior.

This deployment is effected by filling or inflating the air bag proper using gasses generated by, or released from, an inflator unit. The inflated air bag thus acts as a cushion for the passenger. In this role as a cushion, the proper inflation is important. For example, if the bag is underinflated, an insufficient pressure is applied to appropriately stop the passenger's forward movement. Conversely, if the bag is overinflated, the bag is too rigid and too much pressure will be applied, such that the bag itself causes injury. To reduce the possibility of overinflation, and to provide better cushioning, various vents are typically provided in the bag for expelling the inflating gas.

In addition to inflation, air bag size is also an important consideration. Specifically, the air bag is filled with gas upon deployment to fill a certain volume, and to extend a certain distance toward the passenger (referred to herein as length). During cushioning of the passenger to halt forward movement, the air bag is partially deflated, reducing its volume. This reduction in volume is primarily due to compression of the bag in the direction of the passenger, i.e., lengthwise. As such, the bag must have a length which permits it to partially compress when halting the passenger's movement, yet still provide a barrier between the passenger and the steering wheel, dashboard, etc. when the movement is halted.

To complicate this situation, the proper amount of inflation for an air bag will vary with several factors. For example, the severity of the collision, and thus the necessary deceleration of the passenger will vary for each collision. In this regard, less inflation is needed for relatively minor collisions, while more inflation is needed for severe collisions. The severity of the collision also determines the size of the air bag, specifically in the direction of the passenger or length. For minor collisions, the length need not be as great as for severe collisions.

Another factor (at least for certain types of inflator units) is ambient temperature. For the most common types of contemporary inflator units, the inflator will produce an amount of gas which varies proportionally with ambient temperature. As such, if the temperature is low (e.g., 5° C.), less gas is produced, and if the temperature is high (e.g., 30° C.), more gas is produced.

These factors are of course taken into account during air bag design. For example, the length of the air bag is designed to be the largest necessary for severe collisions, and the volume is designed to provide proper inflation pressure for a severe collision even at cold temperatures. The possibility of excess pressure for a lesser collision is alleviated by the design of the vents in the bag, or additional vents in the gas generator.

While this arrangement is acceptable, it has been desired in the art to permit a bag response to vary with these (or other) factors to provide a more optimal response. To this end, U.S. Pat. No. 5,048,863 to Henseler et al. discloses an air bag system having a gas generator which produces proportionally larger amounts of gas with increasing severity of collision. This of course increases internal pressure in the bag for more severe collisions.

This patent also discloses that the bag may have a variable volume. This is achieved by taking a bag, folding an exterior wall of the bag upon itself, and then providing break-away stitching to maintain the fold. This stitching will maintain the fold at lower pressures, but fails at the higher pressures produced for severe collisions. As such, the volume and length of the bag are increased for more severe collisions.

While this arrangement does permit the bag response to vary in order to improve performance, there are drawbacks to this approach. Specifically, the folding is produced near the forward face of the bag, close to or including the contact area with the passenger. Passenger contact with these folds is less desirable than passenger contact with a smooth unbroken surface. Additionally, the folds in this patent are not stitched across their length, but are only "tacked" at discrete locations. This will result in the fold being inflated along with the main section of the bag. This would of course tend to distort the bag shape and again provide a less than desirable surface for passenger contact.

SUMMARY OF THE INVENTION

An object of the present invention is to provide an air bag for use in a passive air bag restraint system which provides increased safety for the passenger.

Another object of the present invention is to provide such an air bag which will adapt to provide the proper amount of cushioning for the passenger under a variety of circumstances.

Yet another object of the present invention is to provide an air bag which will adapt to provide the proper amount of cushioning under widely varying ambient temperatures.

A further object of the present invention is to provide an air bag which will adapt to provide the proper amount of cushioning under a wide range of collision forces or deceleration rates.

Yet another object of the present invention is to provide such an air bag which has an internal volume which is variable.

Another object of the present invention is to provide such an air bag which has a length which is variable.

Yet another object of the present invention is to provide such an air bag which includes an intermediate wall defining a first volume, and an outer wall defining a second volume greater that the first, with the intermediate wall breaking under a predetermined internal pressure to cause the outer wall to be used.

A further object of the present invention is that the connections between the intermediate and outer walls is spaced from the passenger such that increases in seam thickness, folds or free edges do not contact the passenger.

These and other objects are achieved by an air bag cushion having variable volume. The air bag includes a front wall having a central region for contacting the passenger, and a periphery. This periphery is connected to a periphery of both an intermediate wall and a rear wall. Both of these walls are operatively connected to the gas generator, but the rear wall has a larger area than the intermediate wall. The generator provides gas to initially inflate the volume defined between the front wall and intermediate wall. The intermediate wall, however, is connected to the gas generator in a manner which permits its release upon exceeding a predetermined pressure within the bag. Above this pressure the intermediate wall is released and the gas inflates the larger volume defined between the front wall and the rear wall. As such, if a small amount of gas is produced, such as for a minor collision or due to reduced ambient temperature, the smaller volume is inflated to the proper pressure. If a greater amount of gas is generated, such as for a major collision or due to increased ambient temperature, the larger volume is inflated to provide the proper pressure.

BRIEF DESCRIPTION OF THE DRAWINGS

The objects and features of the invention noted above are explained in more detail with reference to the drawings, in which like reference numerals denote like elements, and in which:

FIG. 1 is a cross-sectional side view of a bag according to the present invention inflated to fill the reduced volume;

FIG. 2 is a cross-sectional side view of the bag of FIG. 1 inflated to the increased volume;

FIG. 3 is a cross-sectional detail view showing an alternative break-away arrangement; and FIG. 4 is a cross-sectional detail view showing an alternative peripheral break-away.

DETAILED DESCRIPTION OF THE INVENTION

With reference to FIG. 1, an air bag system according to the present invention is generally designated by reference numeral 10. The system 10 includes the various components present in an inflatable passive restraint system, including a gas generating means 12. The means 12 may take any compatible form, such as pyrotechnic (e.g., azide), fluid fueled (liquid or gas), hybrid, stored gas, etc. The means 12 may also vary between those generators which may produce only a predetermined amount of gas, or may produce increasing amounts of gas with increasing severity of collision. The particular configuration of the gas generating means is not critical, but will include an outlet section 14 through which the gas exits. The outlet section will typically have a plurality of ports (not show) through which the gas exits, and these ports may be arranged axially (i.e., toward the passenger) or radially. Operatively mounted over the outlet is a bag according to the present invention, generally designated by reference numeral 16.

The bag 16 is formed of flexible but strong material, as is known in the art. It is noted that the thickness of the material forming the bag has been exaggerated in the figures for clarity. The bag 16 includes a front wall 18 which is intended to be closest the passenger in the inflated condition, as shown in the figures. The front wall 18 includes a central section 20 and a peripheral edge 22. The peripheral configuration of the front wall may vary, but would typically be circular, at least when the bag 16 is employed for protecting the driver. It is preferred that the front face 16 be non-permeable, such as by coating as is known in the art.

The bag 16 also includes an intermediate wall 24. The wall 24 is formed of flexible, preferably permeable, fabric, and includes a central section 26 and a peripheral edge 28. As with the front wall, the peripheral edge of the intermediate wall will typically be circular, and will preferably correspond to that of the front wall. In the embodiment shown in FIGS. 1 and 2, the peripheral edge 28 of the intermediate wall is permanently secured to the peripheral edge 22 of the front wall. This may be effected in any known manner, such as stitching 30, adhesives, thermal bonding, etc. With their edges thus secured, the front and intermediate walls 20 and 24 define a first or initial volume 32 (FIG. 1) within their confines.

The intermediate wall 24 includes a gas opening 34 in its central region 23. For many applications the opening will be circular, and centered within the circular periphery. The opening 34 operatively receives the outlet 14 of the gas generating means, such that the gas from means 14 may fill volume 32, as is shown in FIG. 1.

The gas will fill the first volume, increasing the pressure within the volume and thus inflating the bag. As is known in the art, this pressure must be maintained within upper and lower limits to prevent injury to the passenger. As discussed above, however, the ambient temperature may proportionally affect the amount of gas generated or the pressure within the first volume. As such, if the front and intermediate walls are sized such that the bag 16 will fully inflate with the proper pressure at low temperatures, the pressures may exceed the desired maximum at higher ambient temperatures.

Also as discussed above, the volume (or more particularly length) of the bag needed to properly cushion a passenger increases with increasing severity of the collision (i.e., increasing deceleration). To account for both of these variables, the bag 16 may adaptively increase its volume and size to fit the particular conditions.

To achieve this, the bag 16 further includes a rear wall 36. As with the previous walls, rear wall 36 also includes a central section 38 and a peripheral edge 40. Also as before, the peripheral edge of the rear wall will typically be circular, but will correspond to that of the front wall. It is preferred that the rear wall be permeable.

The peripheral edge 40 of the rear wall is permanently secured to the peripheral edge 22 of the front wall. In the embodiment shown in FIGS. 1 and 2, this securement is indirect, as the intermediate wall 24 is located between the front and rear walls. In such a case the rear wall is secured to the intermediate wall 24, and thus to the front wall. This may be again effected in any known manner, such as adhesives, thermal bonding, etc., or by the same stitching 30 used previously. With their edges thus secured, the front and rear walls 20 and 36 define a second or final volume 42 (FIG. 2) within their confines.

As may be seen in FIG. 1, the rear wall 36 has an area which is larger than that of the intermediate wall 24 (i.e., it is larger in size). It is preferred, however, that the peripheral configuration (e.g, circular) of all three walls be substantially similar. As such, for the example shown the rear wall would be circular with a diameter greater than that of the intermediate wall. This will necessarily result in the peripheral length of the rear wall being greater than that of the intermediate wall. To permit the attachment of these peripheral edges it will therefore be necessary to form gathers or folds (not shown) in the peripheral edge of the rear wall. It is preferred that these gathers be substantially uniform about the periphery.

As with the intermediate wall 24, the rear wall 36 includes a gas inlet 44 (FIG. 2) in its central region 38. Again, for many applications the inlet will be circular, and centered within the circular periphery. The inlet 44 is sealingly secured to the gas generating means, such as by a cover plate 45, and receives the outlet 14 of the gas generating means, such that the gas from means 14 may fill volume 42, as is shown in FIG. 2. Other arrangements are of course suitable for securing the bag to the gas generating means. For example, the rear wall 36 could substantially or fully encompass the generator, such that the gas generating means is received within the volumes 32 and 42.

In the embodiment of FIGS. 1 and 2, while the rear wall 36 is directly secured to the gas generating means, the intermediate wall 24 is indirectly secured to the generating means. Specifically, the portion of the intermediate wall 24 surrounding the opening 34 is releasably secured to the rear wall at a position in close proximity to the inlet 44 of the rear wall (or at least on the rear wall in proximity to the gas generating means 12). By releasably secured, it is meant that the attachment will persist until a predetermined force is applied, at which point the attachment will fail. This may be achieved by use of break-away stitches 46 (FIG. 1), adhesives, ultrasonic or thermal bonding, etc.

The force applied to the attachment is produced by the inflation of the bag 16. With reference to FIG. 1, upon sensing a collision (or receiving a signal to that effect), the gas generating means 12 will begin generating the inflation gas. As the generating means is in communication with the opening 34 in the intermediate wall, the gas will begin to fill the first volume 32, increasing the fluid pressure therein. This will result in the inflation of the first volume 32. This internal pressure within the first volume will cause tension forces within the front and intermediate walls, bringing the front and intermediate walls to a taut condition as shown.

It is noted that, since the opening in the interior wall is connected to the rear wall, in actuality the portion of the rear wall between the opening 34 and the generating means will also become taut. This combination of the intermediate wall and portion of the rear wall is referred to as intermediate gas restriction means. This intermediate gas restriction means is frangible, due to the releasable connection at the opening.

As may be envisioned, this will in turn cause a force tending to separate the releasable attachment between the intermediate and rear walls. This force will increase with increasing pressure within the first volume 32. Therefore, the predetermined force necessary to cause separation is caused by a corresponding predetermined pressure within the first volume 32.

If the gas generating means halts generation at a pressure below the predetermined pressure, no separation occurs, and the bag will remain in the configuration of FIG. 1 for the duration of its inflation. This situation could occur if the collision is sensed to be minor, or if the ambient temperature is low and affects gas generation. The attachment of the intermediate and rear walls will typically allow little or no gas to pass through the releasable connection, and as such the rear wall will typically remain flaccid at this point.

If additional gas is generated to raise the internal pressure above the predetermined pressure, the stitches 46 (or other means) will fail. This will result in the gas flooding the second volume 42, causing the rear wall to be placed in a taut condition, as shown in FIG. 2. As may be recalled, the rear wall has a greater area than that of the intermediate wall. Therefore, the second volume 42 is greater than that of the first volume. This increase in volume produces two effects.

First, the pressure within the volume will be reduced in comparison to the pressure immediately before separation. Second, the bag exterior is larger, causing the length of the bag to increase, as may be seen by comparison of FIGS. 1 and 2.

With regard to the pressure drop, this may of course be corrected by additional gas generation. However, this may not always be desired. For example, the pressure drop may result in an internal pressure which, combined with the increased length, is better adapted for collisions which are moderately severe. The additional gas generation to further raise the internal pressure could thus be employed only when the collision is sensed to be stronger, such that the pressure is only increased for very severe collisions.

Furthermore, the gas generation may be controlled even below the predetermined separation pressure. For example, the generator may produce an internal pressure well below the predetermined pressure for a very minor collision, but continue to generate more gas to reach a higher pressure (still below the predetermined pressure) for a minor collision.

This type of incremental pressure increase, both above and below the predetermined separation pressure, would result in four different levels of inflation pressure and two different volumes, each adapted for optimal protection in increasingly severe collisions. As may be appreciated, the use of four levels is exemplary only, and a greater or lesser number could of course be employed. Similarly, the use of a single intermediate wall gas restriction means is also exemplary, and two or more could be employed.

The increase in volume may alternatively be use solely with a gas generating means which is not controlled for incremental generation, but which is affected by temperature. As noted above, for some generators the volume of gas produced is less in cold temperatures. Additionally, the temperature of the gas will affect the internal pressure, such that a lesser pressure may be achieved at low temperatures even though the amount of gas is constant. The variable volume of the present bag may help to minimize variation produced by these factors.

Specifically, in low temperatures with reduced generation or pressure, the gas would fully inflate the first volume and provide proper protection. At higher temperatures, however, the increased generation or pressure can cause separation to access the larger bag volume and eliminate the possibility of overinflation to a dangerous pressure. As such, even with a standard gas generating means the bag 16 will adapt to variable factors.

As is known in the art, air bags are typically provided with one or more vents to permit the gas to exit the bag and provide cushioning. This is also the case in the present invention, as the intermediate wall 24 is provided with one or more inner vents 48, and the rear wall is provided with one or more outer vents 50. Both sets of vents are formed by openings through the material of the wall, typically circular.

The vents operate in a known manner to expel gas, especially upon collapse due to contacting the passenger. The vents are preferably located such that each vent on the intermediate wall is maintained in proximity to an associated vent on the rear wall to define an associated vent pair. Considering the larger area of the rear wall, prior to separation the rear wall will be loose and flaccid over the intermediate wall, possibly causing the associated vents on the intermediate and rear walls to move well out of alignment. This unaligned condition may be sufficient to permit the expelled gas to pass through the vents 48 at a sufficient flow rate. To improve this alignment, however, the vents 48 and 50 may be located near to peripheries 28 and 40, where less movement of the flaccid rear wall is possible. A similar effect could be achieved by placing the vents adjacent the releasable attachment.

To ensure alignment of associated vents, the peripheries of the vents may be releasably secured together, as shown by the break-away stitches 52 in FIG. 1, set to release that the predetermined pressure noted above. As may be envisioned, these stitches will also release to permit full inflation of the second volume 42. As before, other means such as adhesives, etc. may be used for such a releasable connection. Additionally, as shown in FIG. 1, some of the associated vents may be releasably secured while others are not. Furthermore, if the vents are sufficiently close to the peripheries 28 and 40, it may be possible to permanently secure the vents together without adversely affection inflation of the second volume.

A further variation for the vents could be to form the inner and outer vents for variable performance with the first and second volumes. For example, the inner vents 48 could have a first area which permits a moderate amount of venting. In contrast, the outer vents 50 could be larger to permit greater venting and as such a softer (i.e., more easily compressible) bag. Since the gas must first vent through the inner vents prior to release, this would provide a firmer bag before release and a softer bag after release.

With reference to FIG. 3, there is shown an alternative arrangement for releasably securing the intermediate wall, with like elements retaining like reference numerals.

In this embodiment, the opening 34 of the intermediate wall is directly secured to the gas generating means 12. This may be effected by securing the opening 34 with the cover plate 45 as shown, by placing the generating means 12 interior of the intermediate wall (and within the volume 32) in a manner similar to that described above for the rear wall, or in any equivalent manner.

To permit the releasable connection, the intermediate wall is provided with a line of reduced strength in a closed geometric shape (in this case circular). This closed shape will permit the intermediate wall to fully separate from the generating means. The reduced strength line may be formed in a variety of ways, such as perforations 54, reduced material thickness, etc. It is noted that in this embodiment the intermediate wall, by itself, would thus form the intermediate gas restriction means, but the gas restriction means would still be frangible. As may be envisioned, upon reaching the predetermined pressure within the first volume 32 the reduced strength line will fail and the bag will increase to the second volume 42 as described above.

In each of the embodiments above, the intermediate wall is released adjacent to the generating means, such that the interior portion of the released intermediate wall is free of support. Additionally, it is noted that the entrance for gas into the second volume 42 may be to the rear of that interior portion. This may result in the gas generated after separation pushing the released interior wall forward toward the front wall 20. Depending upon the mass of the intermediate wall and the thickness of the front wall, this may be undesirable.

A further embodiment shown in FIG. 4 overcomes this problem by providing the separation line for the intermediate wall adjacent to the peripheral edge 40 of the rear wall. While not shown in FIG. 4, in this embodiment the opening 34 of the intermediate wall is permanently secured to the gas generator (or equivalent arrangements are provided as outlined above). The peripheral edge 28 of the intermediate wall is spaced inwardly of the connection between the front and rear walls, and is releasably secured to the rear wall adjacent its peripheral edge 40. As in the first embodiment, this is shown with the use of break away stitches 56 set to release at the predetermined pressure.

As may be seen, with this arrangement the intermediate gas restriction means will thus include the intermediate wall and the annular outer peripheral portion of the rear wall adjacent the peripheral edge of the front wall. Again, however, the intermediate wall means is frangible.

As with the first embodiment, the first volume will initially inflate, and if the pressure then rises above the predetermined pressure the intermediate wall means will fail and the second volume will inflate. In this embodiment, however, the flow of gas passes in front of the intermediate wall, such that the wall is pressed backward against the rear wall.

This outer peripheral arrangement is of course not limited to the peripheral stitches 54, but may be modified in a manner similar to the embodiment of FIG. 3. In particular, the intermediate wall could be permanently secured both to the gas generating means and to the peripheral edges 22 and 40, but include a closed line of reduced strength (not shown) adjacent to its peripheral edge 28. With this arrangement the rupture of the reduced strength line would again permit increased volume while forcing the released intermediate wall back against the rear wall.

Various other modifications of the concepts disclosed herein are of course possible. For example, the line of reduced strength could be located closer to the radial midpoint of the intermediate wall. Alternatively, the intermediate wall could have a much shorter radial length (i.e., be a thinner annulus), and be releasably connected to a radially central region of the rear wall, such that a much larger portion of the rear wall forms a part of the intermediate gas restriction means. While various forms of the invention are possible, in each case there are provided a front wall, an intermediate wall means and a rear wall, with the intermediate gas restriction means being frangible to permit increased inflation from the first to the second volume.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An air bag inflation assembly, comprising:

gas generating means for producing an inflation gas; and a bag operatively associated with said means for filling said bag with said inflation gas, said bag including:

a front wall formed of flexible material and having a peripheral edge;

intermediate gas restriction means formed of a flexible material, said front wall and said intermediate gas restriction means together defining a first volume which is inflated by said gas and being suitable for functioning as a passive restraint for collisions, said intermediate gas restriction means being frangible upon said inflation gas within said volume reaching a predetermined pressure; and a rear wall formed of flexible material and having a peripheral edge connected to said front wall, said front wall and said rear wall together defining a second volume only upon rupture of said intermediate gas restriction means, said second volume being greater than said first, and is suitable for functioning as a passive restraint for collisions, said rupture of said intermediate gas restriction means being due to said inflation gas within said first volume reaching said predetermined pressure.

2. An assembly as in claim 1, wherein said intermediate gas restriction means includes a line of weakened strength, said line being a closed geometric shape in proximity to said gas generating means.

3. An assembly as in claim 2, wherein said intermediate gas restriction means includes an intermediate wall formed of flexible material and having a peripheral edge permanently secured to said peripheral edge of said front wall, and an opening operatively associated with said gas generating means, said opening being releasably secured to said rear wall, said releasable securement being broken upon said first volume being subjected to said predetermined pressure.

4. An assembly as in claim 3, wherein said releasable securement is formed by break-away stitches.

5. An assembly as in claim 4, wherein said peripheral edges of said front, intermediate and rear walls are substantially circular.

6. An assembly as in claim 4, wherein each of said intermediate and rear walls includes at least one vent in proximity to each other to define an associated vent pair, and wherein at least one said vent pair is releasably secured together.

7. An assembly as in claim 1, wherein said intermediate gas restriction means includes a line of weakened strength, said line being a closed geometric shape in proximity to said peripheral edge of said intermediate gas restriction means.

8. An assembly as in claim 7, wherein said intermediate gas restriction means includes an intermediate wall formed of flexible material and having a peripheral edge releasably secured to said rear wall, said releasable securement being broken upon said first volume being subjected to said predetermined pressure.

9. An assembly as in claim 8, wherein said releasable securement is formed by break-away stitches.

10. An assembly as in claim 9, wherein said peripheral edges of said front, intermediate and rear walls are substantially circular.

11. An assembly as in claim 10, wherein said intermediate wall further includes a centrally located opening, said opening being substantially aligned with an inlet in said rear wall, said inlet being operatively associated with said gas generating means.

12. An assembly as in claim 1, wherein said intermediate gas restriction means includes a line of weakened strength, said line being a closed geometric shape intermediate said gas generating means and said peripheral edge.

13. An assembly as in claim 12, wherein said intermediate gas restriction means includes an intermediate wall formed of flexible material and having a peripheral edge permanently secured to said front wall, a central section permanently operatively associated with said gas generating means, said line of weakened strength being broken upon said first volume being subjected to said predetermined pressure.

14. An assembly as in claim 13, wherein said releasable securement is formed by perforations.

15. An assembly as in claim 13, wherein said peripheral edges of said front, intermediate and rear walls are substantially circular.

16. An assembly as in claim 15, wherein said intermediate wall further includes a centrally located opening, said opening being substantially aligned with an inlet in said rear wall, said opening and said inlet being permanently secured to said gas generating means.

17. An air bag for use with a gas generator, comprising:

a front wall formed of flexible material and having a peripheral edge;

an intermediate wall formed of a flexible material and including an opening constructed and arranged for operative association with the gas generator, said front wall and said intermediate wall together defining a first volume inflatable by gas from the generator and which is suitable as a passive restraint for a collision, said intermediate wall including a line of weakened strength rupturable upon said inflation gas within said first volume reaching a predetermined pressure;

a rear wall formed of flexible material and having a peripheral edge connected to said front wall and an opening constructed and arranged for operative association with the gas generator, said front wall and said rear wall together defining a second volume only upon rupture of said intermediate wall, said second volume being greater than said first, said rupture of said intermediate wall being due to the gas within said first volume reaching said predetermined pressure.

18. A bag as in claim 17, wherein said opening of said intermediate wall is releasably secured to said rear wall to define said line of weakened strength, said releasable securement being broken upon said first volume being subjected to said predetermined pressure.

19. A bag as in claim 17, wherein a peripheral edge of said intermediate wall is releasably secured to said rear wall to define said line of weakened strength, said releasable securement being broken upon said first volume being subjected to said predetermined pressure.

20. A bag as in claim 17, wherein said line is a closed geometric shape intermediate said gas generating means and a peripheral edge of said intermediate wall.

* * * * *

UNITED STATES PATENT AND TRADEMARK OFFICE
CERTIFICATE OF CORRECTION

PATENT NO. : 5,560,649
DATED : 1 October 1996
INVENTOR(S) : Davin G. Saderholm and Brian M. Shaklik It is certified that error appears in the above-indentified patent and that said Letters Patent is hereby corrected as shown below:

At column 8, lines 10, 13 and 38, "intermediate wall means" should be
--intermediate gas restriction means--.

Signed and Sealed this

Eleventh Day of March, 1997

Attest:

BRUCE LEHMAN

Attesting Officer    Commissioner of Patents and Trademarks